(12) United States Patent
Narusawa et al.

(10) Patent No.: US 8,830,313 B2
(45) Date of Patent: Sep. 9, 2014

(54) INFORMATION PROCESSING APPARATUS, STAGE-UNDULATION CORRECTING METHOD, PROGRAM THEREFOR

(75) Inventors: Ryu Narusawa, Kanagawa (JP); Yu Hirono, Tokyo (JP); Junichi Sakagami, Tokyo (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 13/162,210

(22) Filed: Jun. 16, 2011

(65) Prior Publication Data

US 2012/0002032 A1 Jan. 5, 2012

(30) Foreign Application Priority Data

Jul. 1, 2010 (JP) .................. P2010-151112

(51) Int. Cl.
| | |
|---|---|
| H04N 9/47 | (2006.01) |
| H04N 7/18 | (2006.01) |
| G02B 21/24 | (2006.01) |
| G02B 21/36 | (2006.01) |

(52) U.S. Cl.
CPC ............ *G02B 21/241* (2013.01); *G02B 21/367* (2013.01)
USPC ........................................................ 348/79

(58) Field of Classification Search
USPC ........................................................ 348/79
See application file for complete search history.

(56) References Cited

U.S. PATENT DOCUMENTS

| | | | | |
|---|---|---|---|---|
| 5,367,401 | A * | 11/1994 | Saulietis ....................... | 359/398 |
| 5,621,519 | A * | 4/1997 | Frost et al. .................. | 356/124.5 |
| 6,031,930 | A * | 2/2000 | Bacus et al. .................. | 382/133 |
| 8,169,505 | B2 * | 5/2012 | Hoshi ........................ | 348/231.3 |
| 2002/0131167 | A1 | 9/2002 | Nguyen et al. | |
| 2003/0123061 | A1 * | 7/2003 | Shekel et al. ................. | 356/400 |
| 2005/0285049 | A1 | 12/2005 | Montagu et al. | |
| 2008/0266652 | A1 | 10/2008 | Yazdanfar et al. | |
| 2009/0253966 | A1 * | 10/2009 | Ichimura ...................... | 600/175 |

FOREIGN PATENT DOCUMENTS

| | | |
|---|---|---|
| JP | 2009-37250 | 2/2009 |
| WO | 01/84209 | 11/2001 |

OTHER PUBLICATIONS

European Patent Office, Extended European Search Report issued in connection with European Patent Application No. 11170915.0, dated Feb. 25, 2013. (9 pages).

* cited by examiner

*Primary Examiner* — Chikaodili E Anyikire
(74) *Attorney, Agent, or Firm* — K&L Gates LLP

(57) ABSTRACT

Provided is an information processing apparatus including: a connection connecting to a microscope including a stage having a disposition surface on which a target object can be placed, and an image picking-up section including an objective lens for picking up an image of the object, the microscope being movable in first and second axis directions orthogonal to an optical axis of the objective lens and orthogonal to each other and in a third axis direction along the optical axis; a calculator calculating, as an undulation-correcting value, a value for correcting a misalignment of a position in the third axis direction for each predetermined image-capturing range smaller than the disposition surface; a correcting-value storage storing the calculated value; and a corrector correcting a relative distance between the stage and the objective lens on the basis of the stored value for each image-capturing range.

6 Claims, 7 Drawing Sheets

| Y-axis coordinate [μm] | X-axis coordinate [μm] | | | | |
| --- | --- | --- | --- | --- | --- |
|  | 0 | 10 | 20 | 30 | 40 |
| 0 | 3 | 3 | 1 | -2 | -3 |
| 10 | 4 | 4 | 2 | 1 | 1 |
| 20 | 2 | 1 | 0 | 1 | 1 |
| 30 | -3 | -4 | -5 | -2 | 0 |
| 40 | -1 | -1 | 0 | 1 | 2 |

Undulation-correcting value [μm]

FIG.6

INFORMATION PROCESSING APPARATUS, STAGE-UNDULATION CORRECTING METHOD, PROGRAM THEREFOR

CROSS REFERENCES TO RELATED APPLICATIONS

The present application claims priority to Japanese Priority Patent Application JP 2010-151112 filed in the Japan Patent Office on Jul. 1, 2010, the entire content of which is hereby incorporated by reference.

BACKGROUND

The present disclosure relates to an information processing apparatus configured to process image information obtained by means of a microscope in a medical, pathological, biological, or material field or the like, a stage-undulation correcting method in the information processing apparatus, and a program therefor.

In the medical or pathological field, there has proposed a system that digitalizes an image of a specimen of a cell, tissue, organ, or the like of a biological body, which has been obtained by means of an optical microscope, so that a doctor, a pathologist, or the like can examine the organ or the like or diagnoses a patient on the basis of the digitalized image. Such a system is generally called virtual microscope.

For example, in a method described in Japanese Patent Application Laid-open No. 2009-37250, an image which has been optically obtained from a slide specimen placed on the stage of the microscope, is digitalized by means of a video camera installing a charge coupled device (CCD), and then, a digital signal thereof is input into a personal computer (PC) and is visualized on a monitor. The pathologist performs an examination or the like while viewing the image displayed on the monitor.

SUMMARY

In order to pick up an image of the specimen on the stage for each small region by means of the microscope, it is necessary for the stage to be movable in biaxial (X-axis and Y-axis) directions orthogonal to an orientation (Z-axis) of an optical axis of an optical system. However, when the stage is movable the biaxial directions, a slight inclination or undulation of the posture of the stage becomes easy to occur due to the complicated supporting structure or the like. In the microscope, even with the misalignment of the height position in μm order, an influence on the quality of the image to be observed due to a focusing misalignment of the optical system may not be negligible.

In view of the above-mentioned circumstances, there is a need for providing an information processing apparatus, a stage-undulation correcting method, and a program therefor, which is capable of effectively reducing a focusing misalignment in a microscope using a movable stage so that a high-quality image to be observed can be stably obtained.

According to an embodiment of the present disclosure, there is provided an information processing apparatus including: a connection to which a microscope as a target to be controlled is connected, the microscope including a stage having a disposition surface on which a target object can be placed, and an image picking-up section including an objective lens, which is configured to pick up an image of the target object placed on the disposition surface, the microscope being movable in a first axis direction and a second axis direction, which are orthogonal to an optical axis of the objective lens and are orthogonal to each other and in a third axis direction extending along the optical axis; a calculator configured to calculate, as an undulation-correcting value, a value for correcting a misalignment of a position in the third axis direction for each predetermined image-capturing range smaller than the disposition surface, in a region to be imaged on the disposition surface of the stage; a correcting-value storage configured to store the calculated undulation-correcting value for each image-capturing range; and a corrector configured to correct a relative distance between the stage and the objective lens for each image-capturing range on a basis of the stored undulation-correcting value for each image-capturing range.

In the embodiment of the present disclosure, the calculator calculates, as the undulation-correcting value, the value for correcting the misalignment of the position in the third axis direction for each predetermined image-capturing range smaller than the disposition surface, in the region to be imaged on the disposition surface of the stage. Further, the undulation-correcting value storage stores the calculated value, and the corrector corrects the position in the third axis direction of the stage for each image-capturing range on the basis of the stored undulation-correcting value for each image-capturing range. Thus, it is possible to effectively reduce a focusing misalignment due to an undulation component of the stage so that a high-quality image to be observed can be stably obtained.

The calculator may change the relative distance between the stage and the objective lens, calculate information about a focusing misalignment on a basis of an image captured every time the relative distance is changed, and determine the undulation-correcting value on a basis of a correlation between the position in the third axis direction of the stage and the calculated information about the focusing misalignment.

With this configuration, it is possible to accurately calculate the undulation-correcting value for each image-capturing range on the disposition surface of the stage.

Further, the information processing apparatus according to the embodiment of the present disclosure may further include a flat dummy slide that can be placed on the disposition surface of the stage as the target object in order to calculate the undulation-correcting value by the calculator, the flat dummy slide including a focusing mark formed thereon.

Under the state in which the flat dummy slide is placed on the disposition surface of the stage, the undulation-correcting value is calculated. Thus, it is possible to reduce an influence on the calculation result of the undulation-correcting value due to the undulation component of the object to be observed. As a result, it is possible to effectively reduce the focusing misalignment due to the undulation component of the stage so that the high-quality image to be observed can be stably obtained.

According to another embodiment of the present disclosure, there is provided an undulation-correcting method for a stage of a microscope including the stage having a disposition surface on which a target object can be placed, and an image picking-up section including an objective lens, which is configured to pick up an image of the target object placed on the disposition surface, the microscope being movable in a first axis direction and a second axis direction, which are orthogonal to an optical axis of the objective lens and are orthogonal to each other and in a third axis direction extending along the optical axis, the method including: calculating, as an undulation-correcting value, a value for correcting a misalignment of a position in the third axis direction for each predetermined image-capturing range smaller than the disposition surface, in a region to be imaged on the disposition surface of the stage;

storing the calculated undulation-correcting value for each image-capturing range; and correcting a relative distance between the stage and the objective lens for each image-capturing range on a basis of the stored undulation-correcting value for each image-capturing range.

According to still another embodiment of the present disclosure, there is provided a program causing a computer configured to control a microscope including a stage having a disposition surface on which a target object can be placed, and an image picking-up section including an objective lens, which is configured to pick up an image of the target object placed on the disposition surface, the microscope being movable in a first axis direction and a second axis direction, which are orthogonal to an optical axis of the objective lens and are orthogonal to each other and in a third axis direction extending along the optical axis, the program causing the computer to operate as: a calculator configured to calculate, as an undulation-correcting value, a value for correcting a misalignment of a position in the third axis direction for each predetermined image-capturing range smaller than the disposition surface, in a region to be imaged on the disposition surface of the stage; a correcting-value storage configured to store the calculated undulation-correcting value for each image-capturing range; and a corrector configured to correct a relative distance between the stage and the objective lens for each image-capturing range on a basis of the stored undulation-correcting value for each image-capturing range.

As described above, according to the embodiments of the present disclosure, it is possible to effectively reduce a focusing misalignment in a microscope using a movable stage so that a high-quality image to be observed can be stably obtained.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 6 is a view showing an example of the undulation-correcting table; and

DETAILED DESCRIPTION

Hereinafter, an embodiment of the present disclosure will be described with reference to the drawings.

First Embodiment

Configuration of Image Processing System

Figure 1:
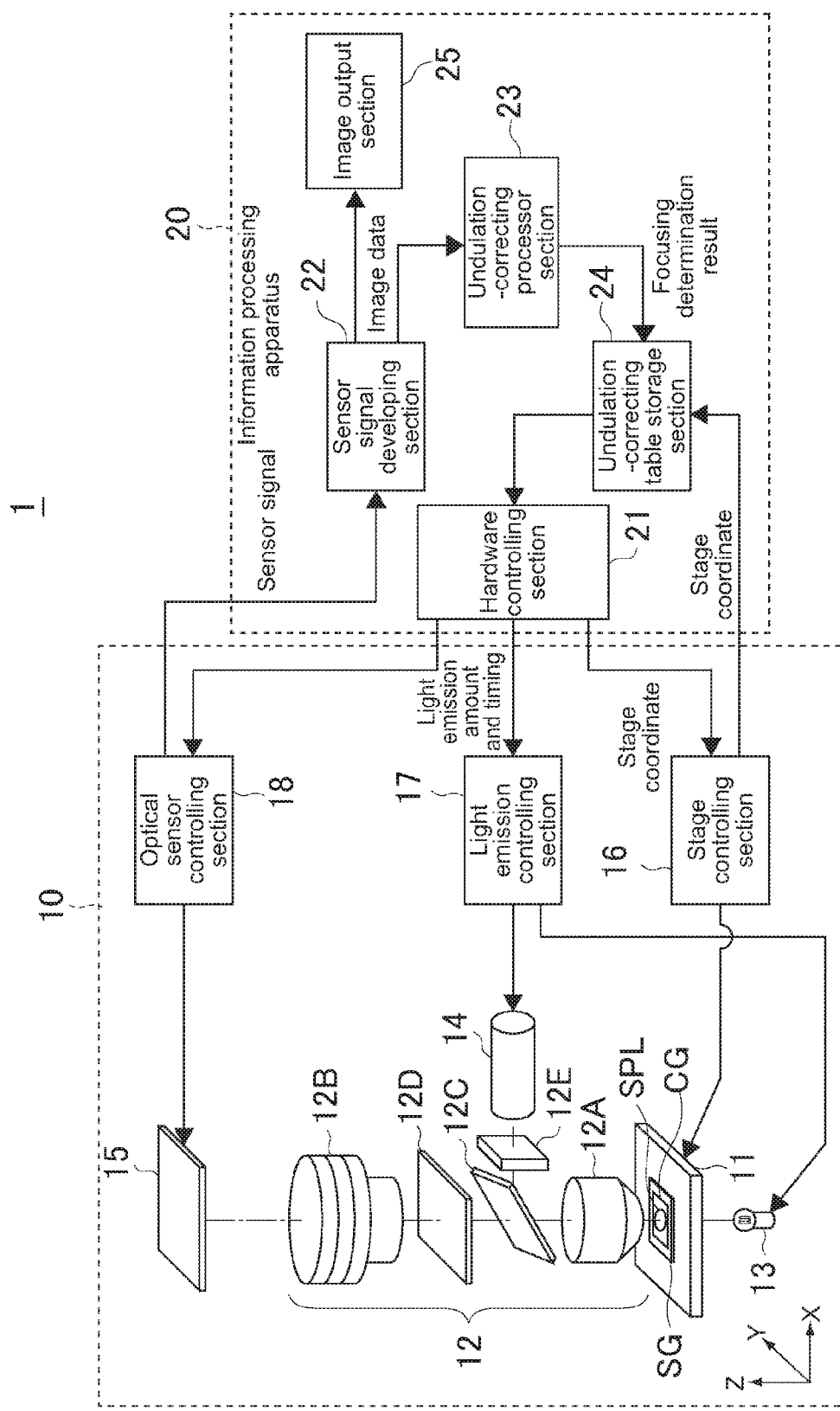
FIG. 1 is a view showing an image processing system according to an embodiment of the present disclosure.

FIG. 1 is a view showing an image processing system according to an embodiment of the present disclosure. As shown in the drawing, an image processing system 1 according to this embodiment includes a microscope 10 and an information processing apparatus 20.

The microscope 10 includes a stage 11, an optical system 12, an illumination lamp 13, a light source 14, an optical sensor 15, an optical sensor controlling section 18, a light emission controlling section 17, and a stage controlling section 16.

The stage 11 has a disposition surface on which a sample SPL of an organ piece, a tissue, or a biopolymer such as a chromosome, for example, which is a target object, can be placed. The stage 11 is a stage movable in triaxial directions orthogonal to each other. Specifically, the stage 11 is movable in an X-axis direction (first axis direction) and a Y-axis direction (second axis direction), which are orthogonal to an optical axis of an objective lens 12A of the optical system 12 and orthogonal to each other, and in a Z-axis direction (third axis direction) extending along the optical axis.

The sample SPL being the target object is fixed by the use of a predetermined fixing method while being sandwiched between a glass slide SG and a cover slip CG, and is stained if necessary. The staining includes, for example, a generally used staining such as a haematoxylin and eosin (H&E) staining, a giemsa staining, or a Papanicolaou staining, as well as a fluorescence staining such as a Fluorescence In Situ Hybridization (FISH) or an enzyme antibody technique. The fluorescence staining is carried out in order to mark a particular target in the specimen, for example.

The optical system 12 is provided above the stage 11 and includes the objective lens 12A, an imaging lens 12B, a dichroic mirror 12C, an emission filter 12D, and an excitation filter 12E. The light source 14 is constituted of a light emitting diode (LED), for example.

The objective lens 12A and the imaging lens 12B magnify the image of the sample SPL, which has been obtained by means of the illumination lamp 13, into a predetermined magnification ratio, and form the magnified image on an imaging surface of the optical sensor 15.

The excitation filter 12E generates an excitation light in such a manner that only a light having an excitation wavelength for exciting a fluorescent pigment among the light emitted from the light source 14 is allowed to pass through the excitation filter 12E. The dichroic mirror 12C reflects the excitation light, which has passed through the excitation filter and has been input into the dichroic mirror 12C to the objective lens 12A, to thereby introduce the excitation light into the objective lens 12A. The objective lens 12A collects the excitation light onto the sample SPL.

In the case where the fluorescent pigment is applied to the sample SPL fixed on the glass slide SG, the fluorescent pigment emits the light due to the excitation light. The light (color-forming light) obtained through this light emission process passes through the dichroic mirror 12C via the objective lens 12A, and arrives at the imaging lens 12B via the emission filter 12D.

The emission filter 12D absorbs the light (external light) other than the color-forming light magnified by the objective lens 12A. The image of the color-forming light after the external light is removed, is, as described above, magnified by the imaging lens 12B, and is imaged on the optical sensor 15.

The illumination lamp 13 is provided below the stage 11 and irradiates the sample SPL placed on the disposition surface with an illumination lamp through an opening (not shown) formed in the stage 11.

As the optical sensor 15, there are exemplified a charge coupled device (CCD) and a complementary metal oxide semiconductor (CMOS). The optical sensor 15 may be provided integrally with the microscope 10, or may be provided within a separate image picking-up apparatus (digital camera or the like) connectable to the microscope 10.

The optical sensor controlling section 18 controls the optical sensor 15 following a control order provided by the information processing apparatus 20. In addition, the optical sensor controlling section 18 receives an output from the optical sensor 15, and transfers the output to the information processing apparatus 20.

The light emission controlling section 17 performs a control relating to the exposure such as a period of time of the exposure and the light emission intensity of the illumination lamp 13 and the light source 14, following the control order provided by the information processing apparatus 20.

The stage controlling section 16 controls the movement of the stage 11 to the X-axis direction, the Y-axis direction, and the Z-axis direction following the control order provided by the information processing apparatus 20.

The information processing apparatus 20 is, for example, an apparatus including a hardware element of a typical computer, and may be the PC, for example. The information processing apparatus 20 is capable of controlling the microscope 10 and saving the image of the sample SPL, which has been captured by means of the microscope 10, as digital image data in a predetermined format. The information processing apparatus 20 includes a hardware controlling section 21, a sensor signal developing section 22, an undulation-correcting processor section 23, an undulation-correcting table storage section 24, and an image output section 25, as a functional configuration to be realized by means of the hardware element of the typical computer. The above-mentioned sections are realized by a program for operating the information processing apparatus 20.

The sensor signal developing section 22 generates digital image data according to the sensor signal received from the optical sensor 15 through the optical sensor controlling section 18. The generated digital image data is supplied to the undulation-correcting processor section 23 and the image output section 25.

The undulation-correcting processor section 23 (calculator, corrector) calculates a value for correcting a misalignment of the position in the Z-axis direction for each image-capturing range smaller than the region to be imaged, in the region to be imaged on the disposition surface of the stage 11, as an undulation-correcting value. More specifically, the undulation-correcting processor section 23 changes a height position in the Z-axis direction of the stage 11, calculates information about the focusing misalignment on the basis of the image captured every time the height position is changed, and determines the undulation-correcting value on the basis of a correlation of the height position in the Z-axis direction of the stage 11 and the information about the focusing misalignment. The undulation-correcting processor section 23 registers the calculated undulation-correcting value for each image-capturing range while associated with an XY coordinate identifying a position of the image-capturing range on the undulation-correcting table. In addition, at the time of capturing an image of the specimen, the undulation-correcting processor section 23 corrects the height position in the Z-axis direction of the stage 11 for each image-capturing range on the basis of the undulation-correcting value for each image-capturing range, which has been registered on the undulation-correcting table. That is, the undulation-correcting processor section 23 reads out the undulation-correcting value corresponding to the image-capturing range from the undulation-correcting table, and controls the stage 11 located at a reference height position in the Z-axis direction to move in the Z-axis direction by an amount corresponding to the undulation-correcting value. Here, "the reference height position in the Z-axis direction" means a position defined in advance as a height position in the Z-axis direction of the stage 11 during image-capturing. The meanings of "the region to be imaged" and "the image-capturing range" will be described later.

The undulation-correcting table storage section 24 (undulation-correcting value storage) means a section on which the undulation-correcting table registering the undulation-correcting value for each image-capturing range 32, which is calculated by the undulation-correcting processor section 23, while associated with the XY coordinate identifying the position of the image-capturing range 32 is stored. The undulation-correcting table storage section 24 is a storage area set in a storage section 207 or the like within the information processing apparatus 20.

The image output section 25 converts the digital image data supplied according to the sensor signal developing section 22 into a file format easy to be processed on the computer, such as JPEG or Tiff, and saves it as a file on the storage section 207.

The hardware controlling section 21 controls the optical sensor controlling section 18, the light emission controlling section 17, and the stage controlling section 16 in the microscope 10.

Figure 2:
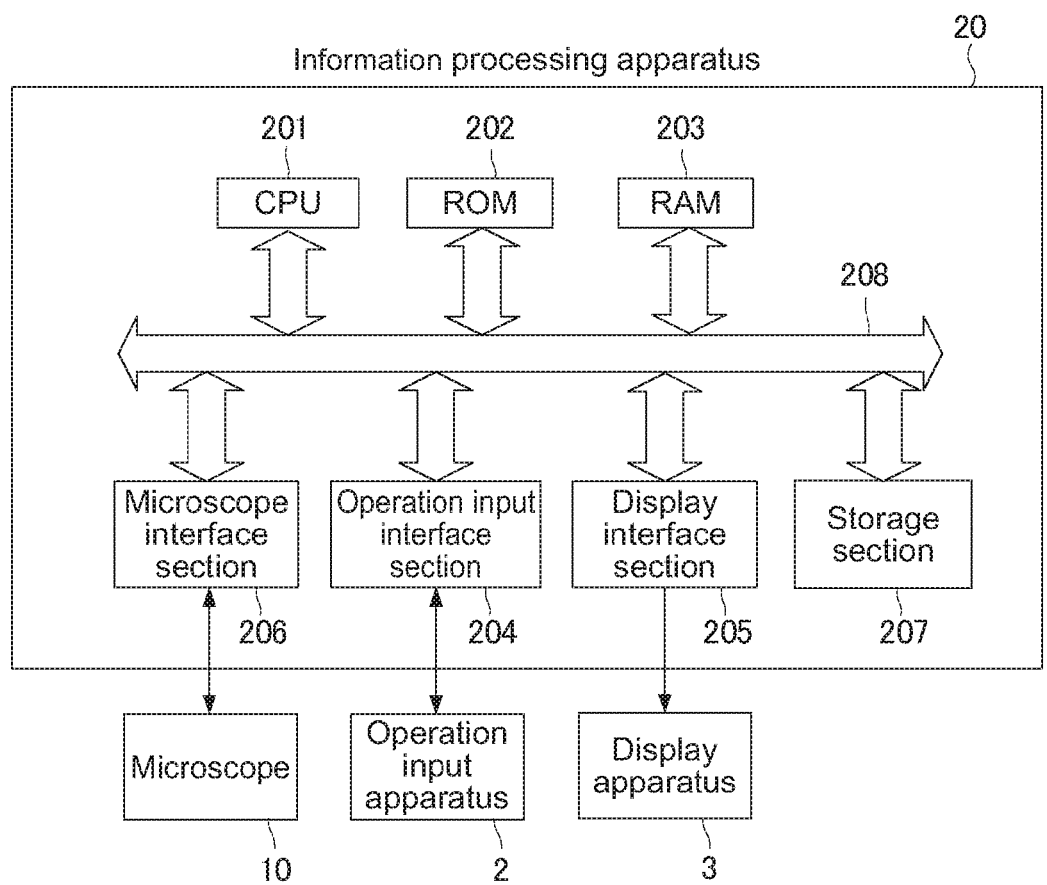
FIG. 2 is a block diagram showing a hardware configuration of an information processing apparatus of FIG. 1.

FIG. 2 is a block diagram showing a hardware configuration of the information processing apparatus 20.

As shown in the drawing, the information processing apparatus 20 includes a central processing unit (CPU) 201, a read only memory (ROM) 202, a random access memory (RAM) 203, an operation input interface section 204, a display interface section 205, a microscope interface section 206, the storage section 207, and a bus 208 that connects the above-mentioned sections to each other.

The ROM 202 stores programs and data for operating the information processing apparatus 20, fixedly. The RAM 203 is used as a main memory of the CPU 201. The storage section 207 is, for example, a readable and writable storage apparatus such as a hard disk drive (HDD), a flash memory, or another solid memory. In addition, the storage section 207 is not only used as a storage area of the captured image data, but also loaded into the RAM 203 so as to store programs to be executed by the CPU 201. The operation input interface section 204 is an interface for a connection with user's operation input apparatus 2 such as a keyboard, a mouse, or a touch panel. For example, the display interface section 205 is an interface for a connection with a display apparatus 3 such as a liquid crystal display, an electro-luminescence (EL) display, a plasma display, or a cathode ray tube (CRT) display. The microscope interface section 206 (connection) is an interface for a connection with the microscope 10.

[Description of Operation]

Next, an operation of the image processing system 1 of this embodiment will be described.

Hereinafter, the description of the operation will be made in the following order:

1. Movement of image-capturing range with respect to region to be imaged;
2. Generation of undulation-correcting table;

3. Calculation process of undulation-correcting value; and

4. Image-capturing process using undulation-correcting table.

[1. Movement of Image-Capturing Range with Respect to Region to be Imaged]

Figure 3:
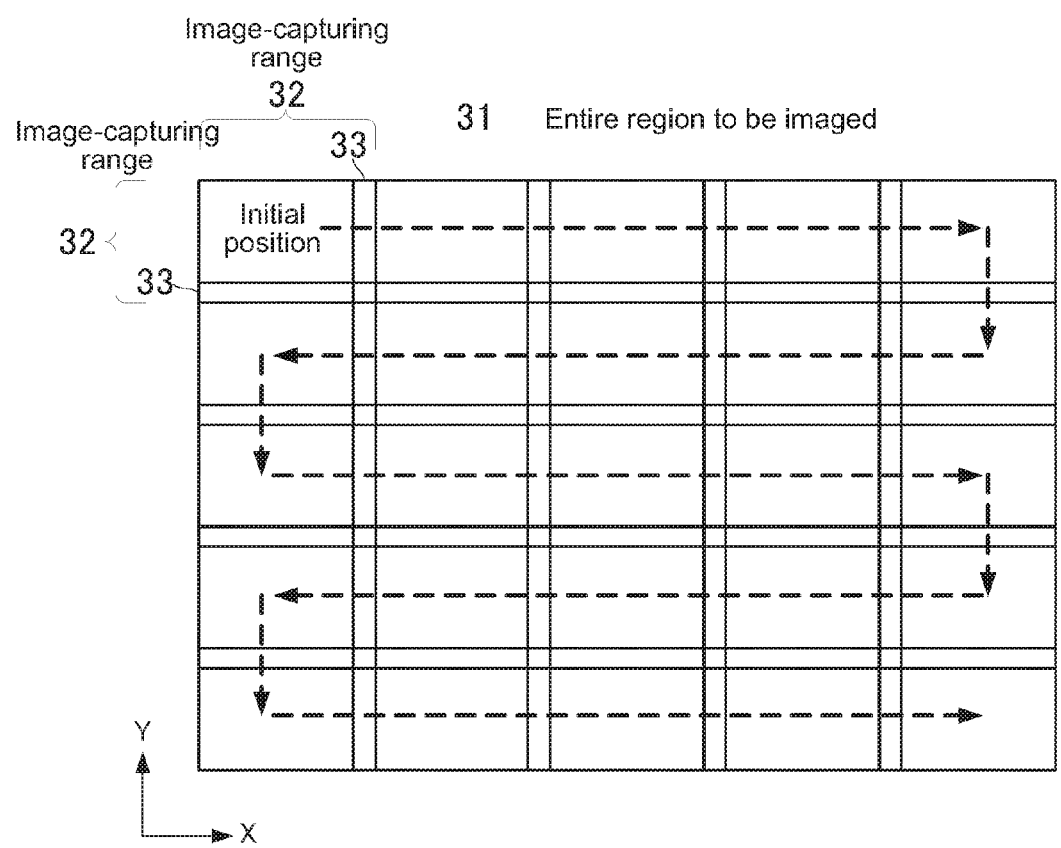
FIG. 3 is a view showing a movement of an image-capturing range with respect to a region to be imaged according to the information processing apparatus of FIG. 1.

FIG. 3 is a view showing a movement of the image-capturing range with respect to the region to be imaged on the disposition surface of the stage 11.

The region to be imaged on the disposition surface of the stage 11 is typically rectangular. It is sufficient that the stage 11 and the optical system 12 be relatively movable in the X-axis direction, the Y-axis direction, and the Z-axis direction. In this embodiment, the configuration in which the optical system 12 is fixed, and the stage 11 is movable in the X-axis direction, the Y-axis direction, and the Z-axis direction is employed. However, the following configuration may be employed. Specifically, in this configuration, the stage 11 is fixed, and the optical system 12 is selectively movable in the X-axis direction, the Y-axis direction, and the Z-axis direction, in contrast to the above-mentioned configuration.

In FIG. 3, the region to be imaged on the disposition surface of the stage 11 is denoted by a reference numeral 31, and an image-capturing range for one time is denoted by a reference numeral 32. The image-capturing range 32 is smaller than the region to be imaged 31. The entire region to be imaged 31 is capture by repeating image-capturing of the image-capturing range 32 every time the image-capturing range 32 is selectively moved in the X-axis direction and the Y-axis direction with respect to the region to be imaged 31. The size of the image-capturing range 32 and the amount of movement in each of the X-axis direction and the Y-axis direction are set so that a predetermined overlapping portion 33 is formed between the image-capturing ranges 32 adjacent to each other in each of the X-axis and the Y axis. For example, an amount of movement for one time in the X-axis direction of the image-capturing range 32 ranges from approximately 60 to 95% of the size in the X-axis direction of the image-capturing range 32. In addition, the size in the X-axis direction of the overlapping region of the image-capturing ranges 32 adjacent to each other in the X-axis direction ranges from approximately 5 to 40% of the size in the X-axis direction of the image-capturing range 32. The above-mentioned percentages may be the same also with respect to the Y-axis direction of the image-capturing range 32.

[2. Generation of Undulation-Correcting Table]

In the image processing system 1 of this embodiment, the following processes are performed:

1. Process of determining the undulation-correcting value for each of the image-capturing ranges 32 on the disposition surface of the stage 11;

2. Process of registering the undulation-correcting value for each of the image-capturing ranges 32 on the undulation-correcting table while associated with the XY coordinate identifying the position of the image-capturing range 32; and 3. Process of correcting the height position in the Z-axis direction of the stage 11 through referring to the undulation-correcting table for each of the image-capturing ranges 32 during observation of the specimen.

First, the generation of the undulation-correcting table will be described.

Figure 4:
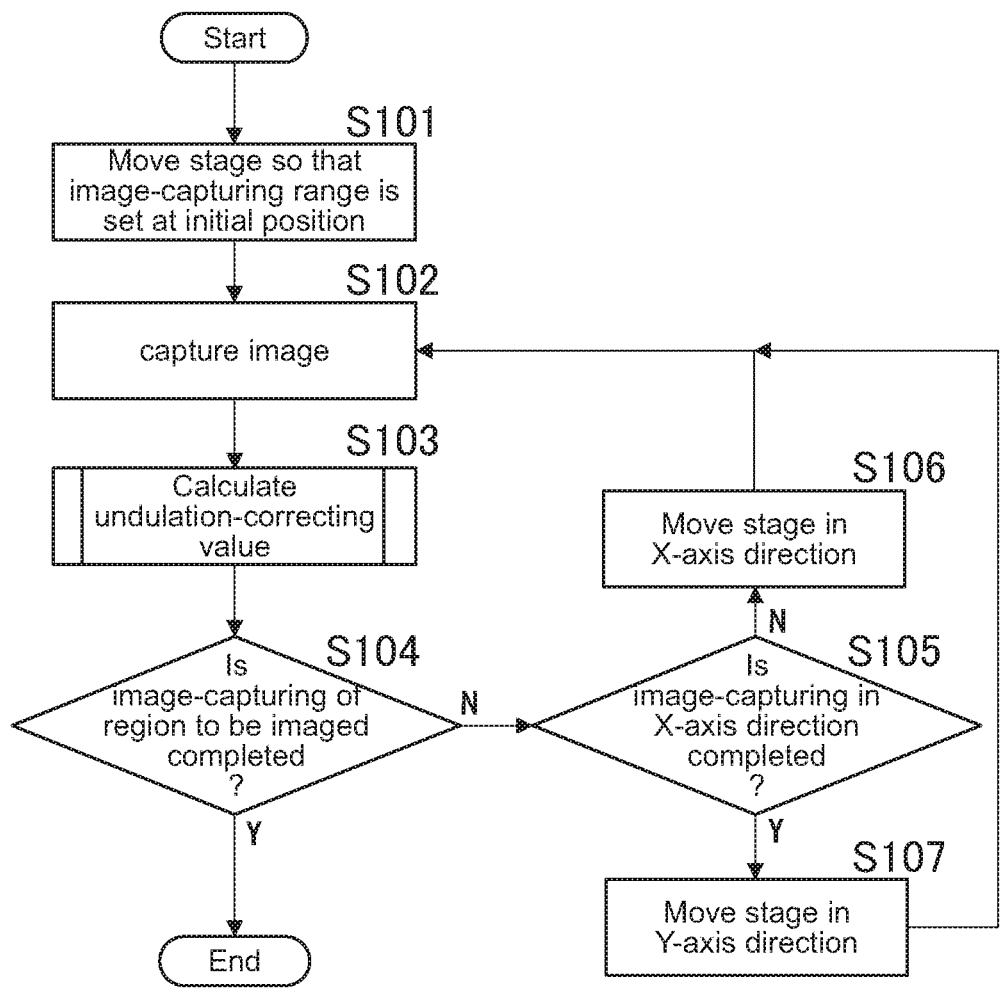
FIG. 4 is a flowchart of a generation process for an undulation-correcting table according to the information processing apparatus of FIG. 1.

FIG. 4 is a flowchart about the generation of the undulation-correcting table.

For the generation of the undulation-correcting table, in order to obtain a correcting value only with respect to an undulation component of the plane shape of the stage 11, a flat dummy slide is placed as the target object on the disposition surface of the stage 11. In this case, the flat dummy slide is obtained through forming a focusing mark on a substrate such as a semi-conductor substrate having an extremely low flatness.

Following the order from the undulation-correcting processor section 23, the hardware controlling section 21 controls the stage 11 to move so that the image-capturing range 32 is set at an initial position in the region to be imaged 31 (Step S101). In FIG. 3, the initial position in the region to be imaged 31 is a position of the upper left end of the region to be imaged 31. It should be noted that an initial height position in the Z-axis direction of the stage 11 is set to correspond to the reference height position.

After the image-capturing range 32 is set at the initial position in the region to be imaged 31, the hardware controlling section 21 controls, following the order from the undulation-correcting processor section 23, each of the light emission controlling section 17 and the optical sensor controlling section 18 to perform image-capturing by means of the microscope 10 (Step S102). The sensor signal from the optical sensor 15 is supplied through the optical sensor controlling section 18 to the sensor signal developing section 22 within the information processing apparatus 20. The sensor signal developing section 22 generates according to the sensor signal the digital image data, and supplies the generated digital image data to the undulation-correcting processor section 23.

The undulation-correcting processor section 23 calculates the value for correcting the misalignment in the Z-axis direction of the position for each of the image-capturing ranges 32 of the stage 11 on the basis of the digital image data as the undulation-correcting value, and registers this undulation-correcting value on the undulation-correcting table while associated with the XY coordinate identifying the position of the image-capturing range 32 (Step S103). The XY coordinate identifying the position of the image-capturing range 32 is, for example, a central coordinate of the image-capturing range 32. A specific calculation method for the undulation-correcting value will be described later.

After the calculation of the undulation-correcting value at the initial position in the region to be imaged 31 and the registration of the undulation-correcting value on the undulation-correcting table are completed, the hardware controlling section 21 controls, following the order from the undulation-correcting processor section 23, the stage controlling section 16 to move the image-capturing range 32 in the X-axis direction by a predetermined distance (Step S106). The undulation-correcting processor section 23 similarly calculates the undulation-correcting value with respect to the new image-capturing range 32, and registers the undulation-correcting value on the undulation-correcting table while associated with the XY coordinate identifying the position of the new image-capturing range 32. After that, similarly, every time the image-capturing is performed after moving the image-capturing range 32 in the X-axis direction, the calculation of the undulation-correcting value and the registration of the undulation-correcting value on the undulation-correcting table are repeated.

After the calculation of the undulation-correcting value and the registration of the undulation-correcting value on the undulation-correcting table with respect to a region for one line in the X-axis direction are completed (Y at Step S105), the hardware controlling section 21 controls, following the order from the undulation-correcting processor section 23, the stage controlling section 16 to move the image-capturing range 32 in the Y-axis direction by a predetermined distance (Step S107). In this manner, the image-capturing range 32 moves to the next line, and then, with respect to that line, the calculation of the undulation-correcting value for each of the image-capturing ranges 32 and the registration of the undulation-correcting value on the undulation-correcting table are similarly repeated.

When, as described above, the movement in the X-axis direction and the Y-axis direction of the stage 11 and the image-capturing are repeated, and the calculation of the undulation-correcting value and the registration of the undulation-correcting value on the undulation-correcting table with respect to the entire region to be imaged 31 are completed (Y at Step S104), the generation process of the undulation-correcting table is terminated.

[3. Calculation Process of Undulation-Correcting Value]

More specifically, after the height position in the Z-axis direction of the stage 11 is changed in a stepwise manner within a predetermined range from the initial position set in advance, and defocus information (misalignment of focus point) being information about the focusing misalignment is calculated on the basis of the digital image data captured every time the height position is changed, the undulation-correcting value is determined on the basis of the correlation of the defocus information and the height position in the Z-axis direction of the stage 11. Here, "the predetermined range" means a range from a positive maximum value to a negative maximum value of an amount of undulation (amount of displacement of the height position in the Z-axis direction) of the stage 11, which is assumed in advance. Hereinafter, "the predetermined range" is referred to as "focus-point search range." A step width being a value used within the focus-point search range is set to be equal to or smaller than the depth of field in the optical system 12 of the microscope 10.

Figure 5:
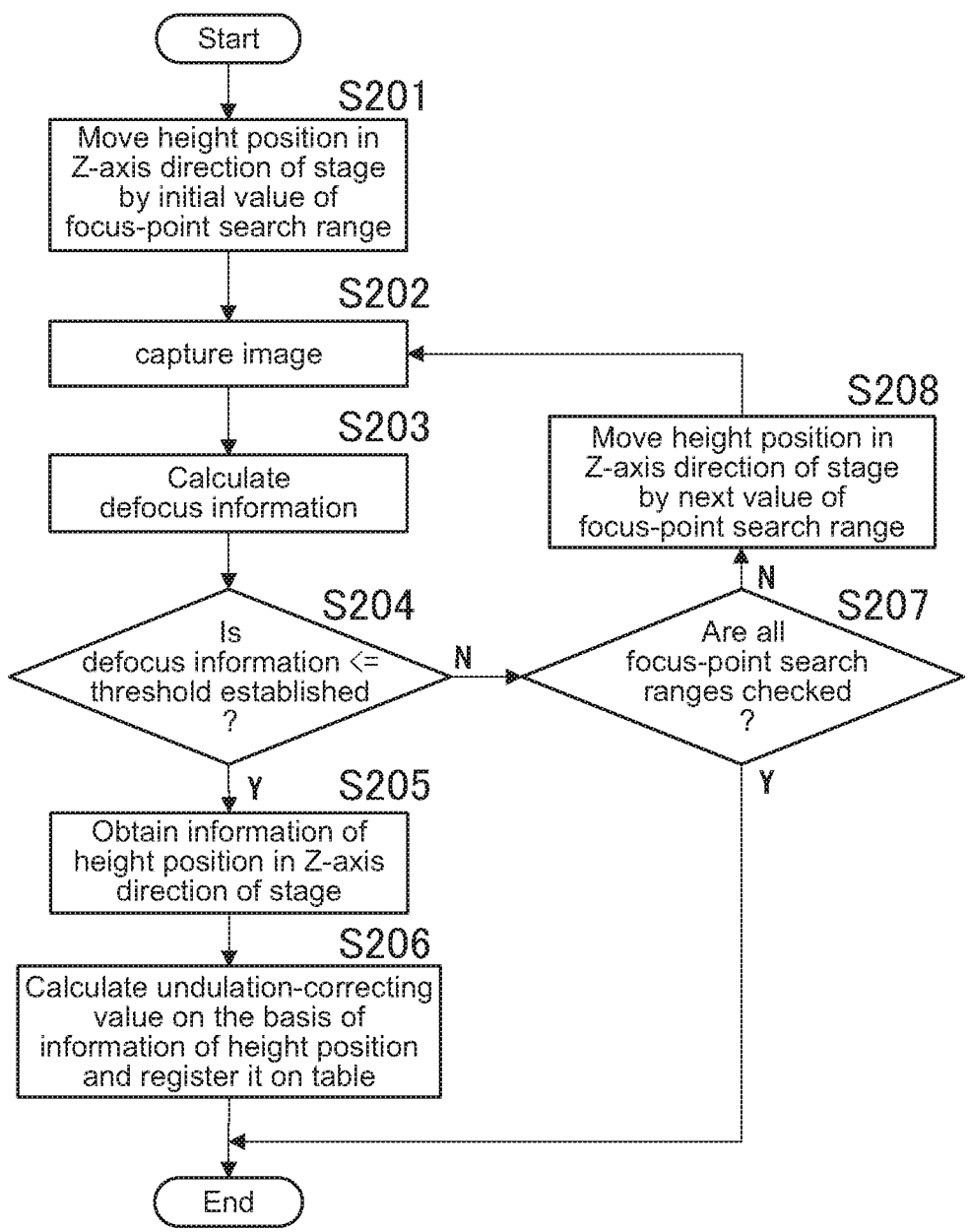
FIG. 5 is a flowchart of a calculation process for an undulation-correcting table according to the information processing apparatus of FIG. 1.

FIG. 5 is a flowchart of one example of the calculation process of the undulation-correcting value.

First, the undulation-correcting processor section 23 controls the stage controlling section 16 through the hardware controlling section 21 to move the height position in the Z-axis direction of the stage 11 by an initial value of the focus-point search range (Step S201). The initial value of the focus-point search range corresponds to, for example, any one of the positive maximum value and the negative maximum value of the amount of undulation, which is assumed in advance.

After that, following the order from the undulation-correcting processor section 23, the hardware controlling section 21 controls the light emission controlling section 17 and the optical sensor controlling section 18 to perform image-capturing by means of the microscope 10 (Step S202). The sensor signal from the optical sensor 15 is supplied through the optical sensor controlling section 18 to the sensor signal developing section 22 within the information processing apparatus 20. The sensor signal developing section 22 generates according to the sensor signal the digital image data, and supplies the generated digital image data to the undulation-correcting processor section 23.

The undulation-correcting processor section 23 calculates the defocus information on the basis of the obtained digital image data according to a predetermined method (Step S203). Here, "the defocus information" means a value indicating an amount of misalignment of the focus point. As the method of calculating the defocus information, there are exemplified a contrast method of determining the focusing through evaluating a high spatial frequency component included in an image and a phase difference detection method of determining the focusing through calculating a phase difference. However, the calculation method is not limited thereto.

Next, the undulation-correcting processor section 23 determines whether the calculated value of the defocus information is equal to or smaller than a threshold (Step S204). Here, the threshold means an upper limit of the misalignment, which can be considered as substantially zero, and a value arbitrarily defined in advance. In the case where the calculated defocus information is equal to or smaller than the threshold (Y at Step S204), the undulation-correcting processor section 23 obtains information of a current height position of the stage 11 (Step S205). Here, the information of the current height position of the stage 11 means information relative to the initial height position, and information indicating the direction (upper or lower direction) and the amount of the movement of the stage 11 in the Z-axis direction from the initial position. Then, the undulation-correcting processor section 23 registers the undulation-correcting value on the undulation-correcting table while associated with the XY coordinate identifying the position of the image-capturing range 32 at that time (Step S206), the undulation-correcting value being a value obtained by multiplying the information of the current height position of the stage 11 by −1.

In addition, in the case where the calculated value of the defocus information is larger than the threshold (N at Step S204), the undulation-correcting processor section 23 controls the stage controlling section 16 through the hardware controlling section 21 to move the height position in the Z-axis direction of the stage 11 by a next value within the focus-point search range (Step S208).

After that, the undulation-correcting processor section 23 calculates again the defocus information on the basis of the digital image data obtained through changing the height position of the stage 11 and performing image-capturing, and compares the defocus information with the threshold. Then, until it is determined that the defocus information is equal to or smaller than the threshold and the undulation-correcting value is obtained, or until all of the focus-point search ranges are checked (Y at Step S207), the movement of the height position of the stage 11 within the focus-point search range, the image-capturing, the calculation of the defocus information, and the comparison with the threshold are repeated.

It should be noted that in the case where the undulation-correcting value may not be obtained in all of the focus-point search ranges, a notice that the calculation of the undulation-correcting value is failed or a notice that the calculation of the undulation-correcting value is to be attempted again after changing the step width in the focus-point search range is output to a user or the like as an error process, for example. Alternatively, a control may be performed so that the calculation of the undulation-correcting value is performed again after changing the step width in the focus-point search range. In this case, the step width is changed into a smaller value.

FIG. 6 is an example of the undulation-correcting table thus generated.

As shown in the drawing, each of the calculated undulation-correcting values is registered on the undulation-correcting table while associated with the representative XY coordinate of the corresponding region. Here, the representative XY coordinate of the region is, for example, a central coordinate of the region. In this example, the undulation-correcting value is calculated for each of the image-capturing ranges 32 of 10 [μm]×10 [μm]. The undulation-correcting value is also indicated in [μm] unit.

By the way, the method of calculating the undulation-correcting value is not limited to the above-mentioned method. For example, the height position in the Z-axis direction of the stage 11 may be changed from the initial position set in advance within the predetermined range in a stepwise manner, the defocus information (amount of misalignment of focus point) being the information about the focusing misalignment may be calculated on the basis of the digital image data captured every time the stage 11 is changed, and the undulation-correcting value may be calculated on the basis of the height position in the Z-axis direction of the stage 11 when the defocus information is minimum. In addition to this, a method of performing a calculation on the basis of an amount of change of the defocus information or the like is also conceivable.

[4. Image-Capturing Process Using Undulation-Correcting Table]

Finally, an image-capturing process using the undulation-correcting table will be described.

Figure 7:
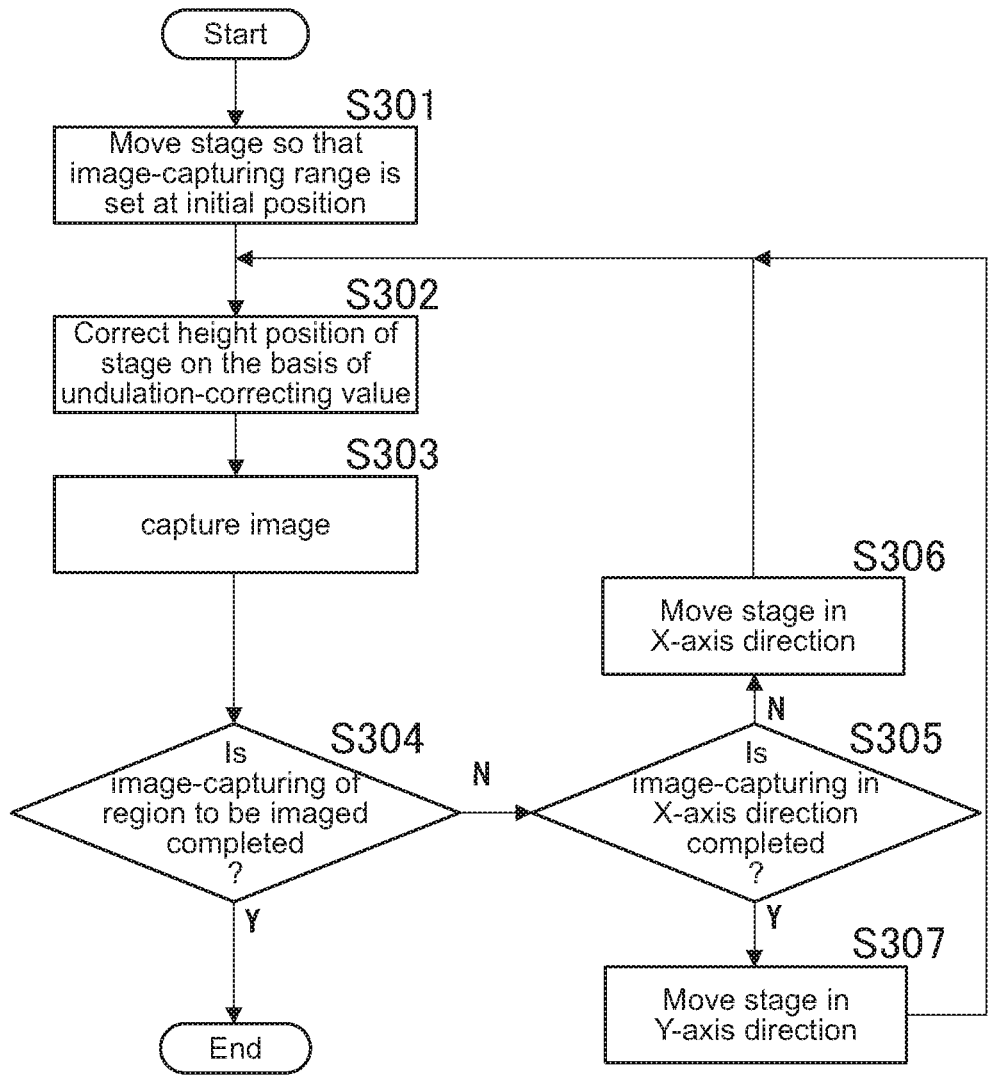
FIG. 7 is a flowchart about an image-capturing process using the undulation-correcting table according to the information processing apparatus of FIG. 1.

FIG. 7 is a flowchart about the image-capturing process using the undulation-correcting table.

It should be noted that the initial height position in the Z-axis direction of the stage 11 immediately before the image-capturing process is set at the reference height position.

First, the glass slide SG and the cover slip CG which are superposed on each other while sandwiching the sample SPL therebetween are placed on the stage 11. Following the order from the undulation-correcting processor section 23, the hardware controlling section 21 controls through the stage controlling section 16 to move the stage 11 so that the image-capturing range 32 is set at the initial position in the region to be imaged 31 (Step S301).

After the image-capturing range 32 is located at the initial position in the region to be imaged 31, the undulation-correcting processor section 23 reads out from the undulation-correcting table the undulation-correcting value corresponding to the XY coordinate represented by the position of the image-capturing range 32. In the case where the undulation-correcting value is not equal to 0, the undulation-correcting processor section 23 controls the stage controlling section 16 through the hardware controlling section 21 to move the stage 11, which has been set at the reference height position in the Z-axis direction, by an amount corresponding to the undulation-correcting value in the Z-axis direction (Step S302).

After that, following the order from the undulation-correcting processor section 23, the hardware controlling section 21 controls the light emission controlling section 17 and the optical sensor controlling section 18 to perform image-capturing by means of the microscope 10 (Step S303). The sensor signal from the optical sensor 15 is supplied through the optical sensor controlling section 18 to the sensor signal developing section 22 within the information processing apparatus 20. The sensor signal developing section 22 generates according to the sensor signal the digital image data, and supplies the digital image data to the image output section 25. The image output section 25 converts the digital image data into the file format easy to be processed on the computer, such as the JPEG or the Tiff, and saves it as a file on the storage section 207.

When the image-capturing at the initial position in the region to be imaged 31 is completed, the image-capturing range 32 is moved by a predetermined distance in the X-axis direction, and the same processes are repeated with respect to an image-capturing range 32 being at the movement destination.

When the image-capturing for one line in the X-axis direction is completed (Y at Step S305), the stage 11 is moved by a predetermined distance in the Y-axis direction so that the image-capturing range 32 moves to a next line (Step S307), and the same processes are repeated also with respect to that line.

As described above, the movement of the stage 11 in the X-axis direction and the Y-axis direction, the correction of the height position of the stage 11, and the image-capturing are repeated and the image-capturing of the entire region to be imaged 31 is completed (Y at Step S304), the image-capturing process is terminated.

As described above, in the image processing system 1 of this embodiment, the information processing apparatus 20 calculates the value for correcting the misalignment of the position in the Z-axis direction for each of the image-capturing ranges 32 of the stage 11, as the undulation-correcting value. The information processing apparatus 20 registers the calculated undulation-correcting value for each of the image-capturing ranges 32 on the undulation-correcting table while associated with the XY coordinate identifying the position of the image-capturing range 32. Then, the information processing apparatus 20 refers to the undulation-correcting table and corrects the height position in the Z-axis direction of the stage 11 for each of the image-capturing ranges 32. As a result, it is possible to effectively reduce the focusing misalignment in the microscope 10 using the movable stage 11 so that a high-quality image to be observed can be stably obtained.

Modified Example

The present disclosure is not limited only to the above-mentioned embodiment, and can be variously modified without departing from the gist of the present disclosure.

In the above-mentioned embodiment, the configuration in which the optical system 12 is fixed, and the stage 11 is movable in the X-axis direction, the Y-axis direction, and the Z-axis direction is employed. However, the following configuration may be employed. Specifically, in this configuration, the stage 11 is fixed, and the optical system 12 is selectively movable in the X-axis direction, the Y-axis direction, and the Z-axis direction, in contrast to the above-mentioned configuration. That is, it is sufficient that a relative distance between the stage 11 and the optical system 12 (objective lens 12A) in the Z-axis direction be set as an undulation-correcting target. Thus, the stage 11 may move in the X-axis and the Y-axis and the optical system 12 may move in the Z-axis direction, and vice versa. Further, a configuration in which both of the optical system 12 and the stage 11 are movable in the X-axis direction, the Y-axis direction, and the Z-axis direction is conceivable.

Although in the above embodiment, the example in which the present disclosure is applied to a fluorescence microscope has been described, the present disclosure may be applied to a microscope other than the fluorescence microscope.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus, comprising:
a connection to which a microscope as a target to be controlled is connected, the microscope including a moveable stage having a disposition surface on which a target object can be placed, and an image picking-up section including an objective lens, which is configured to pick up an image of the target object placed on the disposition surface, the microscope being movable in a first axis direction and a second axis direction, which are orthogonal to an optical axis of the objective lens and are orthogonal to each other and in a third axis direction extending along the optical axis;

a calculator configured to calculate a plurality of undulation-correcting values, each undulation-correcting value being calculated for correcting a misalignment of a position of the moveable stage in the third axis direction for each respective predetermined image-capturing range of a plurality of predetermined image-capturing ranges, each of which has an area in the first axis direction and the second axis direction that is smaller than the disposition surface, in a region to be imaged on the disposition surface of the moveable stage, and the plurality of predetermined image-capturing ranges includes a plurality of rows of predetermined image-capturing ranges in the first direction and a plurality of columns of predetermined image-capturing ranges in the second direction, which is orthogonal to the first direction, wherein each of the plurality of predetermined image-capturing ranges is associated with respective coordinates in the first axis direction and the second axis direction and an undulation-correcting value for correcting misalignment of the position of the moveable stage in the third axis direction at the respective coordinates in the first axis direction and the second axis direction;

a correcting-value storage configured to store the calculated undulation-correcting values for each of the predetermined image-capturing ranges, wherein each of the plurality of undulation-correcting values are stored for each respective predetermined image-capturing range; and a corrector configured to correct a relative distance in the third axis direction between the moveable stage and the objective lens for each predetermined image-capturing range on a basis of the plurality of stored undulation-correcting values for each respective predetermined image-capturing range.

2. The information processing apparatus according to claim 1, wherein
the calculator configured to change the relative distance between the moveable stage and the objective lens, calculate information about a focusing misalignment on a basis of an image captured every time the relative distance is changed, and determine each undulation-correcting value on a basis of a correlation between the position in the third axis direction of the stage and the calculated information about the focusing misalignment.

3. The information processing apparatus according to claim 1, further comprising
a flat dummy slide that can be placed on the disposition surface of the moveable stage as the target object in order to calculate the undulation-correcting value by the calculator, the flat dummy slide including a focusing mark formed thereon.

4. The information processing apparatus according to claim 1, wherein the calculator calculates each undulation-correcting value based on a correlation between defocus information and a height position of the image picking-up section in the third axis direction.

5. An undulation-correcting method for a moveable stage of a microscope including the moveable stage having a disposition surface on which a target object can be placed, and an image picking-up section including an objective lens, which is configured to pick up an image of the target object placed on the disposition surface, the microscope being movable in a first axis direction and a second axis direction, which are orthogonal to an optical axis of the objective lens and are orthogonal to each other and in a third axis direction extending along the optical axis, the method comprising:

calculating a plurality of undulation-correcting values, each undulation-correcting value being calculated for correcting a misalignment of a position of the moveable stage in the third axis direction for each respective predetermined image-capturing range of a plurality of predetermined image-capturing ranges, each of which has an area in the first axis direction and the second axis direction that is smaller than the disposition surface, in a region to be imaged on the disposition surface of the moveable stage, and the plurality of predetermined image-capturing ranges includes a plurality of rows of predetermined image-capturing ranges in the first direction and a plurality of columns of predetermined image-capturing ranges in the second direction, which is orthogonal to the first direction, wherein each of the plurality of predetermined image-capturing ranges is associated with respective coordinates in the first axis direction and the second axis direction and an undulation-correcting value for correcting misalignment of the position of the moveable stage in the third axis direction at the respective coordinates in the first axis direction and the second axis direction;

storing the calculated undulation-correcting values for each of the predetermined image-capturing ranges, wherein each of the plurality of undulation-correcting values are stored for each respective predetermined image-capturing range; and correcting a relative distance in the third axis direction between the moveable stage and the objective lens for each predetermined image-capturing range on a basis of the plurality of stored undulation-correcting values for each respective predetermined image-capturing range.

6. A non-transitory computer readable medium storing a program causing a computer configured to control a microscope including a moveable stage having a disposition surface on which a target object can be placed, and an image picking-up section including an objective lens, which is configured to pick up an image of the target object placed on the disposition surface, the microscope being movable in a first axis direction and a second axis direction, which are orthogonal to an optical axis of the objective lens and are orthogonal to each other and in a third axis direction extending along the optical axis, the program causing the computer to operate as:

a calculator configured to calculate a plurality of undulation-correcting values, each undulation-correcting value being calculated for correcting a misalignment of a position of the moveable stage in the third axis direction for each respective predetermined image-capturing range of a plurality of predetermined image-capturing ranges, each of which has an area in the first axis direction and the second axis direction that is smaller than the disposition surface, in a region to be imaged on the disposition surface of the moveable stage, and the plurality of predetermined image-capturing ranges includes a plurality of rows of predetermined image-capturing ranges in the first direction and a plurality of columns of predetermined image-capturing ranges in the second direction, which is orthogonal to the first direction, wherein each of the plurality of predetermined image-capturing ranges is associated with respective coordinates in the first axis direction and the second axis direction and an undulation-correcting value for correcting misalignment of the position of the moveable stage in the third axis direction at the respective coordinates in the first axis direction and the second axis direction;

a correcting-value storage configured to store the calculated undulation-correcting values for each of the predetermined image-capturing ranges, wherein each of the plurality of undulation-correcting values are stored for each respective predetermined image-capturing range; and a corrector configured to correct a relative distance in the third axis direction between the moveable stage and the objective lens for each predetermined image-capturing range on a basis of the plurality of stored undulation-correcting values for each respective predetermined image-capturing range.

* * * * *